United States Patent [19]
Shimamune et al.

[11] Patent Number: 5,879,521
[45] Date of Patent: Mar. 9, 1999

[54] GAS-DIFFUSION CATHODE AND SALT WATER ELECTROLYTIC CELL USING THE GAS-DIFFUSION CATHODE

[75] Inventors: Takayuki Shimamune, Tokyo; Takahiro Ashida, Kanagawa; Masashi Tanaka, Kanagawa; Shuhei Wakita, Kanagawa; Yoshinori Nishiki, Kanagawa, all of Japan

[73] Assignee: Permelec Electrode Ltd., Kanagawa, Japan

[21] Appl. No.: 922,604

[22] Filed: Sep. 3, 1997

[30] Foreign Application Priority Data

Sep. 3, 1996 [JP] Japan .................................. 8-252480

[51] Int. Cl.$^6$ ....................................................... C25B 9/00
[52] U.S. Cl. .......................... 204/252; 204/282; 204/283; 204/630
[58] Field of Search ................................... 204/282, 283, 204/252, 630

[56] References Cited

U.S. PATENT DOCUMENTS 5,676,808  10/1997  Nishiki et al. ...................... 204/290 R
5,693,213  12/1997  Shimamune et al. .................... 205/510

*Primary Examiner*—Bruce F. Bell
*Attorney, Agent, or Firm*—Sughrue, Mion, Zinn, Macpeak & Seas, PLLC

[57] ABSTRACT

A gas-diffusion cathode disposed in contact with an ion-exchange membrane partitioning an electrolytic cell into an anode chamber and a cathode chamber, wherein at least one guide piece is disposed in the gas-diffusion cathode and a salt water electrolytic cell using the above-described gas-diffusion cathode. By using the above-described gas-diffusion cathode for salt water electrolysis, an aqueous caustic alkali solution formed descending in the direction of gravity in the cathode changes direction of movement by contact with a guide piece, whereby the decreased electrode performance resulting from the hindrance of the supply of raw material gas and the discharge of the gas formed caused by the retention of the descending caustic alkali solution is prevented and a large-sized electrolytic cell can be used without problems generally encountered in conventional electrolytic systems.

5 Claims, 3 Drawing Sheets

GAS-DIFFUSION CATHODE AND SALT WATER ELECTROLYTIC CELL USING THE GAS-DIFFUSION CATHODE

FIELD OF THE INVENTION

The present invention relates to a gas-diffusion cathode capable of efficiently taking out an electrolytic product in a cathode chamber side and also to a two-chamber- or three-chamber-type salt water electrolytic cell using the gas-diffusion cathode. More specifically, the present invention relates to a gas-diffusion cathode provided with at least one guide piece for efficiently guiding an aqueous caustic alkali solution, which is the desired product, to a cathode chamber side of said gas-diffusion cathode and a two-chamber or three-chamber type salt water electrolytic cell using said gas-diffusion cathode.

BACKGROUND OF THE INVENTION

The electrolytic industry typified by chloroalkali electrolysis has played an important role in the material industries. Although chloroalkali electrolysis has such an important role, the energy consumed for chloroalkali electrolysis is large and thus in countries, such as Japan, where the cost of energy is high, energy saving becomes an important consideration. For example, in chloroalkali electrolysis, to solve environmental problems and to attain energy saving, the electrolysis method is converted from a mercury method to an ion-exchange membrane method through a diaphragm, whereby energy saving of about 40% has been attained over about 25 years. However, even these energy savings need improvement, and the electric power cost i.e., the cost of energy, makes up 50% of the total production cost in the chloroalkali electrolysis. Unfortunately, as long as the present method is used, it is impossible to save more electric power. In other words, to attain more energy saving, a radical change such as the correction of the electrode reaction, etc., must be accomplished.

A gas-diffusion electrode having a property of easily supplying a gas as a reaction material to an electrode surface, was developed based on the uses such as fuel cells, etc., as described in H. Wendt, *Electrochemical Hydrogen Technologies*, pages 373–483, 1990 and E. A. Ticianelli at al., *Journal of Electroanalytical Chemistry*, 251, pages 275–281, 1988. Recently, the use of gas-diffusion electrodes for an industrial electrolysis has been investigated. For example, in an on-site production apparatus of hydrogen peroxide, a hydrophobic cathode for performing an oxygen reduction reaction is utilized as described in D. Pletcher, *Industrial Electrochemistry* (2nd edition), pages 279–282, 1991. Also, in an alkali production process or an alkali recovery process, in place of oxygen generation at the anode or hydrogen generation at the cathode as a counter electrode reaction, the hydrogen oxidation reaction (J. Jorissen et al, *Journal of Electrochemistry*, 21, pages 869–876, 1991) or the oxygen reduction reaction at a cathode (Miura, et al., *Journal of Chemical Society of Japan*, pages 732–736, 1982) is performed using a gas-diffusion electrode to effect reduction of electric power consumption. Also, it is reported that depolarization by a hydrogen anode as the counter electrode for metal recovery such as a zinc recovery, etc., and zinc plating is possible (Furuya et al., *Denki Kaaaku Oyobi Kogyo Butsuri Kaaaku* (*Electrochemistry and Industrial Physical Chemistry*), 56, pages 653–655, 1988).

However, in these industrial electrolyses, problems arise from the compositions of solutions and gases or the operation conditions, etc., being far more complicated than those of fuel cells. Additionally, sufficient life and performance of electrodes are not obtained.

As described above, in chloroalkali electrolysis, energy saving is advanced and the electric power source amount w for producing a caustic alkali is reduced to 2,000 kWh per ton of the caustic alkali. However, if using an oxygen cathode reaction in place of the conventional hydrogen generation reaction, the theoretical electrolytic voltage can be reduced from 2.19 V in the conventional method to 1.23 V, then large energy saving accompanied by the reduction can be expected.

For realizing the new process, the development of an oxygen cathode demonstrating high performance and sufficient stability in the above-described electrolytic system is indispensable (Fujita, et al., *Dai 8 kai, Soda Kogyo Gijyutu Tooronkai Yousi Shu* (*The 8th Soda Industrial Technique Forum Summaries*), 1984; Furuya, *The 11th Soda Industrial Technique Forum Summaries*, 1987; and Aikawa, *Soda to Enso* (*Soda and Chlorine*), 45. page 45, 1994).

In a salt water electrolysis using a conventional gas diffusion cathode, for example, an electrolytic cell partitioned by an ion-exchange membrane into an anode chamber and the cathode chamber, the cathode chamber is partitioned by the above-described gas-diffusion cathode into to sections to form a solution chamber at the ion-exchange membrane side and a gas chamber at the opposite side thereof. In this method, an oxygen-containing gas is introduced into the gas chamber and a caustic alkali is produced in the solution chamber.

The gas-diffusion cathode used for the electrolysis must be a so-called gas-liquid separation-type gas-diffusion cathode which sufficiently permeates oxygen only and does not leak caustic alkali from the solution chamber to the gas chamber.

The gas-diffusion cathode (oxygen cathode) proposed at present as the electrode for a salt water electrolysis meeting the above-described requirement is produced by applying a catalyst such as silver, platinum, etc., onto an electrode base material formed in a sheet form with a mixture of a carbon powder and PTFE.

The anodic reaction and the cathodic reaction in a conventional electrolytic method are $2Cl^- \rightarrow Cl_2 + 2e$ (1.36 V)

$2H_2O + 2e \rightarrow 2OH^- + H_2$ (−0.83 V)

respectively and the theoretical decomposition voltage is 2.19 V.

On the other hand, when the electrolysis is carried out while supplying an oxygen-containing gas to the cathode, the reaction becomes $2H_2O + O_2 + 4e\ V \rightarrow 4OH^-$ (0.40 V), and thus the electric power consumption can be reduced corresponding to theoretically 1.23 V and also to about 0.8 V even in the practical current density range, which means the reduction of 700 kWh per ton of a caustic alkali.

However, while a gas-diffusion cathode of this type can attain such a reduction of electric power, gas-diffusion cathodes present the following various problems.

(1) Carbon used as the electrode material deteriorates at high temperature in the presence of caustic alkali and oxygen, thereby greatly compromising electrode performance.

(2) It is difficult to prevent the leakage of caustic alkali generated into the gas chamber side, especially, when accompanied by the increase of the liquid pressure and the deterioration of the electrode associated with the present electrode as described above.

(3) The preparation of an electrode having the necessary size (1 m²) in a practical cell is difficult.

(4) The pressure in the cell changes according to the height and it is difficult to adjust the supplied oxygen gas pressure to cope with the change.

(5) There is an electrode resistance loss of the catholyte and also a motive power for stirring the catholyte is required.

(6) For practical use, it is necessary to greatly improve the existing electrolytic equipment.

(7) When air is used as the oxygen-containing gas, the carbon dioxide gas in air reacts with the caustic alkali to form sodium carbonate, which precipitates in pores of the gas-diffusion cathode, thereby lowering the gas diffusing capacity of the cathode.

To solve the various problems of the electrolytic method described above using the gas-diffusion cathode, a so-called zero-gap-type electrolytic method shown in FIG. 1 of the w accompanying drawings is proposed (Shimamune, et al., *The 18th Soda Industrial Technique Forum Summaries*).

An electrolytic cell 1 shown in FIG. 1 is partitioned by an ion-exchange membrane 2 into an anode chamber 3 and a cathode chamber (gas chamber) 4, a mesh-form insoluble anode 5 is closely contacted with the anode chamber 3 side of the ion-exchange membrane 3 and a gas-diffusion cathode 6 is closely contacted with the cathode chamber 4 side of the ion-exchange membrane 2. A mesh-form current collector 7 is in contact with the surface of the gas-diffusion cathode 6 and an electric current is supplied though the collector 7.

In addition, numeral 8 is an inlet for anolyte formed at the bottom plate of the anode chamber, 9 is a outlet for anolyte and gas formed at the upper plate of the anode chamber, 10 is an inlet for oxygen-containing gas formed at the upper plate of the cathode chamber, and 11 is an outlet for caustic soda formed at the bottom plate of the cathode chamber.

When while supplying, for example, an aqueous sodium chloride solution to the anode chamber 3 of the electrolytic cell and supplying an oxygen-containing gas to the cathode chamber 4, an electric current is passed through both the electrodes 5 and 6, caustic soda (sodium hydroxide) is formed at the surface of the cathode chamber 4 side of the ion-exchange membrane 2, the caustic soda reaches the surface of the cathode chamber side as an aqueous solution thereof through the gas-diffusion cathode 6 and the soda is recovered as a product.

The properties required for the gas-diffusion cathode (oxygen cathode) used for the above-described electrolytic method differ greatly from those of a conventional-type gas-diffusion cathode. The gas-diffusion cathode must have a sufficient hydrophobic property to avoid being wetted by the aqueous caustic alkali solution. The gas-diffusion cathode must also have adequate liquid permeability, etc., so that the aqueous caustic soda solution can easily permeate through the inside of the cathode. For these purposes, the electrode base material is constructed with a durable metal such as nickel, silver, etc., whereby the above-described problem (1) is solved and electrolysis of a long duration of time can be expected.

Also, because the above-described electrolytic method incorporates a system for recovering the caustic alkali that permeates to the back surface of the electrode, a partition between the solution chamber and the gas chamber in accordance with the above-described gas-diffusion cathode is unnecessary. Accordingly, the electrode is not required to be an integrated structure. Therefore electrode production can be scaled up relatively easily, thereby solving problem (3) discussed above.

Furthermore, as a matter of course, the liquid pressure change due to height variation of the liquid does not occur. Therefore the above-described problem (4) is solved. Also, because the aqueous caustic alkali solution formed in the process reaches inevitably the back surface of the electrode through the inside of the electrode, the above described problem (7) is minimized.

As described above, regarding the salt water electrolytic method, various improvements are made so that the method becomes suitable for an industrial electrolytic system as shown in FIG. 1. In contrast, when the existing electrolytic cell having a height of about 1 meter is utilized, the improved electrolytic method is still insufficient and tends to provide inadequate electrolytic performance. It is assumed that in addition to the aqueous caustic alkali solution formed moving to the back surface of the electrode, a part of the aqueous caustic alkali solution that is formed moves in the direction of gravity along the height of the cell (i.e., descends to the height direction or the direction of gravity). It is further assumed that when the amount of the caustic alkali solution formed exceeds the capacity of the gas-diffusion cathode itself to remove the caustic alkali solution moving in the height direction, the solution is retained in the inside of the electrode, whereby the supply of an oxygen-containing gas and the discharge of the produced gas are obstructed resulting in lower electrolysis performance.

SUMMARY OF THE INVENTION

An object of the present invention is to provide a gas-diffusion cathode which solves the above-described problems of conventional techniques, that is, which prevents decreased electrode performance in a salt water electrolysis process using a zero-gap-type gas-diffusion cathode to which various improvements are applied and, in particular, is produceable in sufficient size to satisfy the requirements of electrolytic cells using the gas-diffusion cathode. This object has not yet been accomplished for practical use in conventional techniques.

Another object of the present invention is to provide a salt water electrolytic cell using the gas-diffusion cathode.

That is, according to the present invention, there is provided a gas-diffusion cathode disposed in contact with an ion-exchange membrane partitioning an electrolytic cell into an anode chamber and a cathode chamber, wherein at least one guide piece is disposed in the gas-diffusion cathode.

Also, by using the gas-diffusion cathode, a salt water electrolytic cell, in particular, a large-sized salt water electrolytic cell can be constructed.

DETAILED DESCRIPTION OF THE INVENTION

Figure 1:
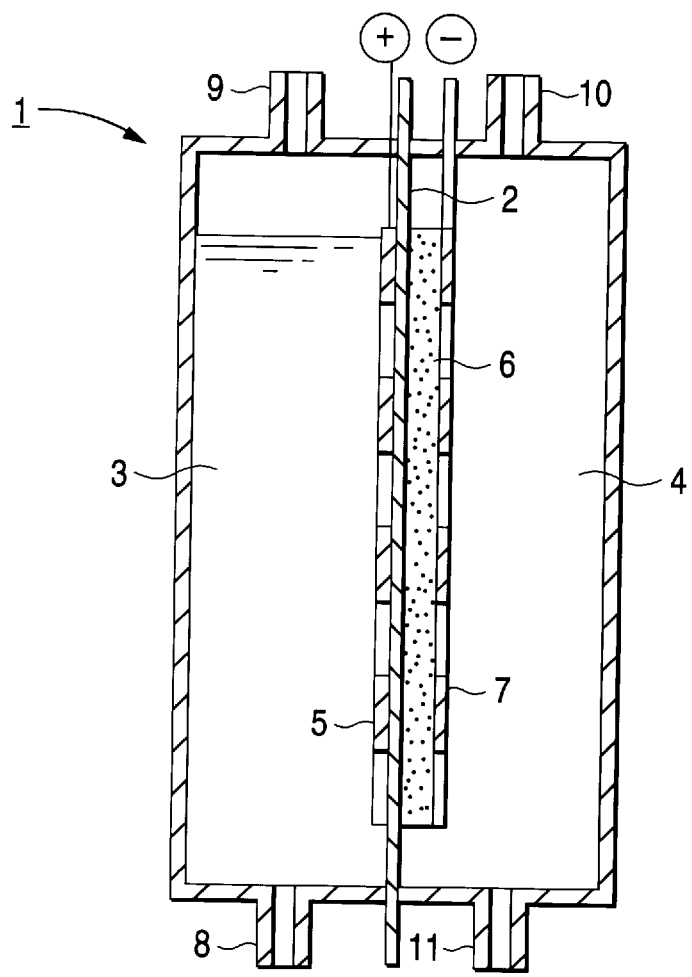
FIG. 1 is a schematic cross-sectional view illustrating a conventional electrolytic cell having incorporated with a gas-diffusion cathode.

The present invention is described in detail below.

In accordance with the present invention, the obstruction of the smooth supply of a raw material gas and discharge of the gas formed is removed. Conventionally, this obstruction is caused by the retention of an aqueous caustic alkali solution in the gas-diffusion cathode. The instant invention involves disposing one or more guide pieces in the gas-diffusion cathode for introducing the caustic alkali solution to the cathode chamber side, said caustic alkali solution substantially descending by gravity without permeating in the gas-diffusion cathode to the cathode chamber side. In an industrial electrolysis, such as a sodium chloride electrolysis, a Glauber's salt electrolysis, etc., using a gas-diffusion cathode, smooth and continuous removal the caustic alkali solution from the cathode chamber can be accomplished by bringing the above-described caustic alkali solution descending in the direction of gravity into contact with the guide piece to change the direction of motion of the caustic alkali solution.

As described above, for example, in a soda electrolysis using a gas-diffusion cathode, most of the aqueous caustic alkali solution formed with the progress of the electrolysis permeates to the back surface of the gas-diffusion cathode and is removed from the surface thereof. However, although small in amount, an aqueous caustic alkali solution descends to the direction of gravity without moving to the back surface of the gas-diffusion cathode. Where such caustic alkali solution exists, the pores of the gas-diffusion cathode are clogged, whereby the gas supply is obstructed and stable electrolytic operation cannot be continued.

The removal of the caustic alkali solution from the surface of a gas-diffusion cathode may be accomplished by imparting a water repellent property to at least the back and front surfaces of the gas-diffusion cathode, splitting the electrode itself into plural parts to reduce the height dimension, etc. However, because the caustic alkali solution descending in the electrode described above does not exist on the surface of the electrode, the removal of the caustic alkali solution descending in the direction of gravity in the cathode cannot be accomplished by these means.

Accordingly, in the present invention, one or more guide pieces are disposed in the inside of a gas-diffusion cathode in an enclosed state or in a state that a part thereof is exposed to the cathode chamber side, the caustic alkali solution descending in the gas-diffusion cathode the direction of gravity is brought into contact with the guide piece to change the direction of travel thereof towards the back surface direction of the gas-diffusion cathode such that the caustic alkali solution smoothly permeates to the back surface of the gas-diffusion cathode, whereby the remaining amount of the caustic alkali solution formed in the gas-diffusion cathode is minimized or reduced to zero and thus the supply of gas to the gas-diffusion cathode and the discharge of the produced gas from the gas-diffusion cathode are facilitated to decrease or prevent lowering of the electrode performance.

The guide piece(s) are disposed in the gas-diffusion cathode such that the guide piece(s) can contact the caustic alkali solution descending in the direction of gravity to change the direction of the caustic alkali. Thus it is preferred that the guide piece is in the form of a rod or a sheet having an eventual (after pressure treatment) diameter or thickness thinner than the thickness of the gas-diffusion cathode so that the guide piece(s) can be disposed in a tabular gas-diffusion cathode. There is no particular restriction on the material of the guide piece if the material is impermeable to the liquid, that is, a caustic alkali solution, and does not adversely affect the gas-diffusion cathode and the ion-exchange membrane. A durable metal or resin is preferred. Exemplary metals include nickel, stainless steel, etc., and exemplary resins include PTFE, etc.

The diameter or the thickness of the guide piece is any value thinner than the thickness of the gas-diffusion cathode as described above. Therefore, the cross section of the rod-form guide piece changes according to the above-described diameter and is generally from 0.1 to 100 mm$^2$ and when a sheet-form guide piece is disposed, the thickness thereof is generally from about 0.05 to 5 mm and preferably from 0.1 to 2 mm. It is desirable that the guide piece be disposed in the gas-diffusion cathode such that the guide piece varies the flow of the caustic alkali solution descending in the direction of gravity at between 90° and 45°. Also one guide piece may be used or plural guide pieces may be disposed with an interval or changing the directions of them. By the disposition of such guide piece(s), the movement of the caustic alkali solution to the back surface of the gas-diffusion cathode is accelerated. Examples of guide piece(s) suitable for the purpose include expanded mesh and netting. In the case of disposing plural guide pieces, the interval thereof may differ according to the height, etc, of the gas-diffusion cathode but is usually from 1 to 100 mm and preferably from 20 to 50 mm.

It is particularly preferred that the guide piece(s) are not completely disposed within the gas-diffusion cathode but are disposed in the gas-diffusion cathode so that a part thereof exposes in the cathode chamber side, thereby the caustic alkali solution coming into contact with the guide piece certainly reaches the cathode chamber.

Also, plural guide pieces may be disposed in the gas-diffusion cathode as described above. However, if the guide pieces are disposed excessively, the effective volume of the gas-diffusion cathode is reduced thereby hindering the supply and discharge of gas. Thus a reduced diameter of each guide w piece or a reduced number of the disposed guide piece(s) sometimes is preferred.

The gas-diffusion cathode of the present invention except the guide piece(s) may be constituted as a conventional gas-diffusion cathode, for example, it is prepared by forming a catalyst layer composed of a catalyst and binder on an electrode support.

It is preferred that the support described above is composed of a material capable of keeping a proper porosity and electric conductivity for supplying and removing an electric current, a gas, and a liquid. For example, a porous material such as a wire gauze having a corrosion resistance made up of titanium, niobium, tantalum, stainless steel, nickel, zirconium, carbon, silver, conductive ceramics ($NiO_x$, $SiO_x$) etc.; sintered materials made up of the powders of them; metal fiber sintered materials; foams, etc., is used and is previously washed by each proper pre-treatment.

To improve the corrosion resistance of the support using a small amount of a noble metal, it is preferred to apply silver plating to the support. As a hydrophobic silver plating bath, a bath prepared by adding from 10 to 200 g/liter of PTFE particles and from 10 to 200 g/(g-PTFE) of a surface active agent (e.g., Megsafac F150, trade name, made by Dainippon Ink and Chemicals, Inc.) to a liquid containing from 10 to 50 g/liter of silver chloride, from 200 to 400 g/liter of ammonium thiocyanate, and from 10 to 30 g/liter of boric acid and dispersing the mixture by a homogenizer can be used. The above-described support is immersed in the dispersion with appropriate stirring and when an electric current is passed at room temperature and at a current density of, for example, from 0.2 to 2 A/dm$^2$, silver is plated on the surface of the support. A plating thickness of from 1 to 100 μm gives good hydrophobic property and corrosion resistance. After plating, it is preferred that the plated support is sufficiently washed.

A catalyst layer is formed on the support. As the catalyst, a metal such as platinum, palladium. ruthenium, iridium, copper, silver, cobalt, lead, etc., or the oxide thereof is preferred. The catalyst is applied to the support, for example, by mixing the catalyst with a binder such as a fluorine resin and a solvent such as naphtha, etc., as the powder thereof to form a paste and fixing the paste of the catalyst to the support; by coating a solution of a salt of the catalyst metal on the surface of the support followed by sintering; by electrically plating a solution of the metal salt on the surface of the support; or by non-electrolytically plating the catalyst onto the support using a reducing agent. The preferred particle size of the fluorine resin powder is from 0.01 to 100 μm.

Efficient mass transfer of the reaction product gas and liquid, can include dispersedly applying a hydrophilic or hydrophobic material to the catalyst or the collector having the catalyst to form hydrophilic or hydrophobic regions. Both regions are needed to obtain a good gas diffusion electrode. As the hydrophobic material, a fluorinated pitch, fluorinated graphite, and a fluorinated resin are preferred materials and particularly, the fluorinated resin may be heated at a temperature of from 200° to 400° C. and preferably from 300° to 370° C. for obtaining a uniform dispersion and good performance. It is preferred that the hydrophobic or hydrophilic regions are continuous to each other along the sectional direction of the electrode.

To dispose the above-described guide pieces in the inside of the gas-diffusion cathode, it is preferred to place said guide piece(s) on the above-described support and integrate them in a body by applying a pressure of from 0.1 to 30 kgf/cm$^2$ and preferably from 1 to 10 kgf/cm$^2$. When the connective strength is insufficient, they may be reinforced using a proper resin, for example, coating a resin on the guide. It is preferred that the thicknesses after connecting the guide pieces are as uniform as possible and also it is preferred to employ a structure such that at least a part of each guide piece is in direct contact with the collector disposed at the back surface of the gas-diffusion cathode.

Also, in place of integrating the guide pieces and the support in a body, it is also a preferred production method in the working efficiency to form concaved portions corresponding to the guide pieces at the back surface side of the gas-diffusion cathode and set the guide pieces in the concaved portions. The width and the length of the concaved portion may be selected according to the size of the guide piece.

The thickness of the electrode composed of the support and the catalyst layer described above is preferably from 0.1 to 0.5 mm and the voids thereof are preferably from 30 to 90%.

Also, to improve the mechanical strength and the electric conductivity of the collector, it is preferred to form an electrically conductive electric current supplying portion having opening of from 30 to 80% to the back of the electrode.

The gas-diffusion cathode having the construction as described above and other constitutional members can be laminated in the order of an anode, an ion-exchange membrane, the gas-diffusion cathode, and a cathode collector. They can be pressed from both sides to form a unit, whereby an electrode structural material is prepared.

In this embodiment, as the ion-exchange membrane, a fluorine resin-series sulfonic acid-type ion-exchange membrane is preferably used and as the anode, a titanium-made insoluble electrode called DSA is preferably used. The anode is preferably porous for improving the adhesion with the ion-exchange membrane.

When it is necessary to closely contact the above-described gas-diffusion cathode with the ion-exchange membrane, it is sufficient that they are previously mechanically connected each other or applying a pressure to them at electrolysis. The pressure is preferably from about 0.1 to 30 kgf/cm$^2$ and more preferably from 0.5 to 5 kgf/cm$^2$.

When the electrode structural material thus prepared is incorporated in a salt water electrolytic cell, for example, a two-chamber-type sodium chloride electrolytic cell or a three-chamber-type Glauber's salt electrolytic cell (the electrolytic cell partitioned by two ion-exchange membranes into an anode chamber, an intermediate chamber, and a cathode chamber and in this case, the gas-diffusion cathode is disposed on the ion-exchange membrane partitioning the electrolytic cell into the intermediate chamber and the cathode chamber) while supplying salt water to the anode chamber and an oxygen-containing gas to the cathode chamber (supplying pure water to the intermediate chamber), an electric current is passed through both electrodes, a caustic alkali, which is the cathodic product, is formed at the gas-diffusion cathode. The aqueous caustic alkali solution thus formed penetrates through the gas-diffusion cathode, reaches the surface of the gas-diffusion cathode, that is, the surface of the electrode member corresponding to the electrode which is not substantially covered with the electrolyte, and is easily released from each electrode member and removed. The caustic alkali solution descending in the direction of gravity in the gas-diffusion cathode is induced to the back surface side of the gas-diffusion cathode by contacting with the above-described guide piece and is smoothly recovered from the inside of the gas-diffusion cathode. Accordingly, each electrode member is not covered with the caustic alkali solution formed, whereby the supply of a raw material gas and the discharge of the produced gas can be smoothly carried out and a stable electrolysis can be continued at a low voltage. In addition, the preferred salt water electrolytic conditions using the above-described gas-diffusion cathode include a temperature of from 10° to 90° C. and a current density of from 1 to 100 A/dm$^2$.

Each of the accompanied FIG. 2 to FIG. 5 is a slant view illustrating a gas-diffusion cathode which can be used in the electrolytic cell shown in FIG. 1 and the same marks are affixed to the same members of the electrolytic cell shown in FIG. 1 and the explanations of the marks are omitted.

Figure 2:
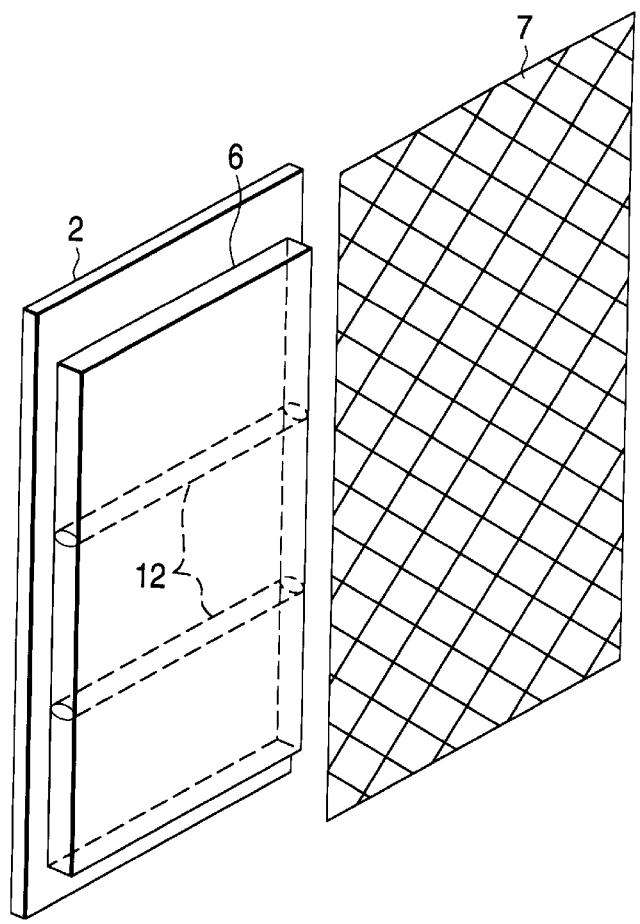
FIG. 2 is a parted slant view showing a 1st embodiment of the gas-diffusion cathode of the present invention.

FIG. 2 shows a gas-diffusion cathode wherein guide pieces are enclosed and two guide pieces 12 are enclosed in the gas-diffusion cathode 6 along the whole length of the width direction of said cathode 6 in the width direction with almost same interval.

Figure 3:
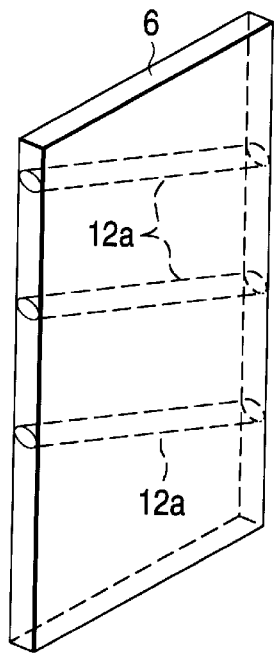
FIG. 3 is a slant view showing a 2nd embodiment of the gas-diffusion cathode of the present invention.

FIG. 3 shows a gas-diffusion cathode wherein guide pieces are also enclosed and in the embodiment, three guide pieces 12a are enclosed in the gas-diffusion cathode 6 with almost same interval and in an inclined state.

Figure 4:
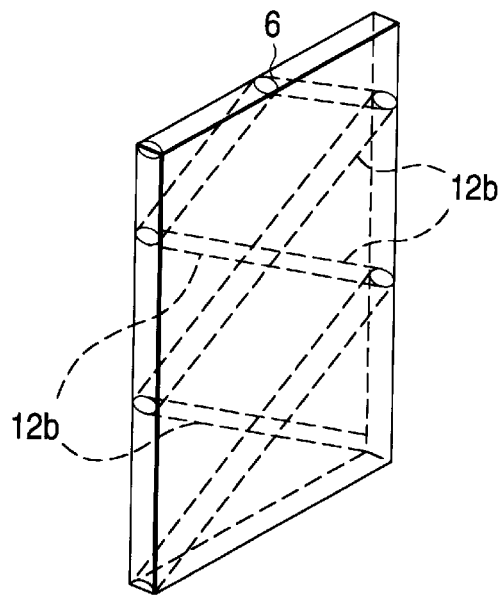
FIG. 4 is a slant view showing a 3rd embodiment of the present invention.

FIG. 4 shows a gas-diffusion cathode wherein guide pieces are also enclosed and in the embodiment, mesh-form guide pieces 12b forming rhombic openings by crossing plural wires are enclosed therein.

Figure 5:
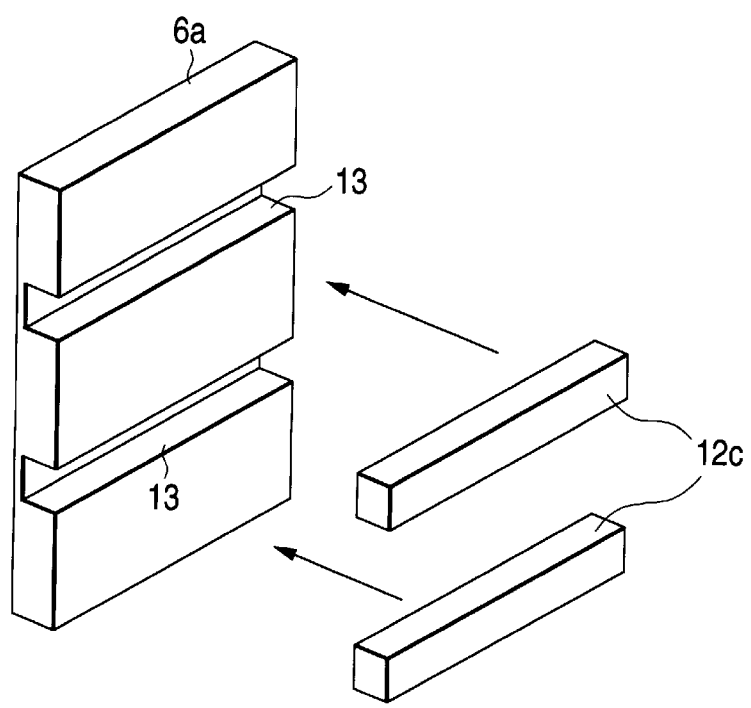
FIG. 5 is a slant view showing a 4th embodiment of the present invention.

FIG. 5 shows the state that two concaved portions 13 extending across the width direction are formed at the surface of the cathode chamber side of a gas-diffusion cathode 6a and each guide piece 12c is set in each concaved portion 13.

Examples of the gas-diffusion cathode of the present invention and the electrolysis using the cathode are described below but these examples do not limit the present invention.

EXAMPLE 1

A silver plated nickel foam of 1 mm in thickness was used as a support (projected electrolytic area 1.25 $dm^2$, width 5 cm, and height 25 cm), silver-made round rods each having a diameter of 0.5 mm were disposed on the support with an interval of 5 cm, and they were integrated in a unit at a pressure of 10 $kgf/cm^2$ to obtain the guide piece-enclosed support of 0.5 mm in thickness. A super-fine silver powder (50 to 100 Å, made by Shinku Yakin K. K.) and a PTFE water suspension (30J, made by Mitsui Fluorochemicals Company, Ltd.) were mixed together at a volume ratio of 1:1. After coating the mixture on the above-described support at a coverage of 500 $g/m^2$, the support was heated in an electric furnace at 350° C. for 50 minutes.

A nickel-made collector mesh (thickness 2 mm, opening ratio 40%, and hole diameter 5 mm) silver-plated using a plating bath containing 30 g/liter of silver chloride, 300 g/liter of ammonium thiocyanate, and 30 g/liter of boric acid was connected to the above-described support to obtain a gas-diffusion cathode.

As an anode, a titanium-made DSA porous anode was used, as an ion-exchange membrane, Nafion 961 (trade name, sulfonic acid type fluorinated membrane, made by E.I. Du Pont de Nemours and Company) was used, the aforesaid gas-diffusion cathode and the anode were closely contacted to both surfaces of the ion-exchange membrane respectively to constitute an electrolytic cell, and the ion-exchange membrane was fixed in the perpendicular direction to horizontal level.

Then, 4 ml/minute of an aqueous saturated sodium chloride solution was supplied as the anolyte at 80° C. and 200 ml/minute of a wet oxygen gas was supplied to the above-described gas-diffusion cathode in an amount of 1.5 times the necessary amount for oxygen consumption.

When an electric current of 37.5 Å was applied at a temperature of 90° C., the cell voltage was 2.25 V and an aqueous 32% caustic soda solution was obtained from the outlet of the cathode chamber at a current efficiency of 96%.

When the electrolysis was continued for 100 days, the cell voltage was increased 10 mV by maintaining the current efficiency of NaOH at 95%.

EXAMPLE 2

When the electrolytic cell was operated under the same conditions as Example 1 except that a silver-made long fiber sintered foam of 0.8 mm in thickness (made by Thermal K.K.) was used as a support, concaved portions each having a width of 2 mm and a depth of 0.5 mm were formed at the surface of the support such that the concaved portions were at an angle of 45° to the horizon with an interval of 2.5 cm, silver wires each having a diameter of 1 mm were contacted with the concaved portions respectively, and they were integrated in a body at a pressure of 10 $kgf/cm^2$ to obtain a guide piece-enclosed support of 0.5 mm in thickness, the cell voltage was 2.15 V and an aqueous 33% caustic soda solution was obtained from the outlet of the cathode chamber at a current density of 96%.

EXAMPLE 3

A silver-made foam (reflected electrolytic area 35 $dm^2$, width 30 cm, and height 117 cm) of 1 mm in thickness was used as a support. Silver meshes (original plate thickness 1 mm) having rhombic openings each having a long diameter of 5 cm, a short diameter of 3 cm, and a notched width 1 mm were placed on the support and they were integrated in a body at a pressure of 10 $kgf/cm^2$ to obtain the guide piece-enclosed support of 0.5 mm in thickness. The same silver-plated material as in Example 1 was used as a collector and the collector was connected to the above-described support to obtain a gas-diffusion cathode.

An electrolytic cell was constructed under the same conditions as in Example 1, an aqueous saturated sodium chloride solution was supplied as an anolyte at 120 ml/minute and 6 liters/minute of a wet oxygen gas-containing gas was supplied to the gas-diffusion cathode in an amount of 1.5 times the necessary amount. When an electric current of 1,050 Å was passed at a temperature of 90° C., the cell voltage was 2.35 V and an aqueous 32% caustic soda solution was obtained from the outlet of the cathode chamber at a current efficiency of 96%.

COMPARATIVE EXAMPLE 1

When the electrolysis was carried out under the same conditions as Example 1 except that the silver round rods were not used, the cell voltage was 2.55 V and an aqueous 33% caustic soda solution was obtained from the outlet of the cathode chamber at a current efficiency of 96%. However, when the electrolysis was continued for 10 days, the cell voltage was about 200 mV raised and the current density was reduced from 96% to 90%.

The gas-diffusion cathode of the present invention is a gas-diffusion cathode disposed in contact with an ion-exchange membrane partitioning an electrolytic cell into an anode chamber and a cathode chamber, wherein at least one guide piece is disposed in the gas-diffusion cathode.

The guide piece disposed in the gas-diffusion cathode is contacted with a caustic alkali solution, which tends to exist in a relatively large amount in a large-scale electrolytic cell and tends to descend to the gravity direction in the gas-diffusion cathode to retain in the cathode, to change the moving direction and induce to the back surface direction of the gas-diffusion cathode.

Accordingly, even when an electrolytic cell is large-sized, the amount of the caustic alkali solution formed, which is liable to retain in the gas-diffusion cathode to obstruct the supply of a raw material gas and discharge of the produced gas, becomes zero or the minimum. In other words, by the present invention, scaling-up of an electrolytic cell can be easily realized without lowering the electrode performance.

The guide pieces may be integrated with the support and the catalyst layer constituting the gas-diffusion cathode in a body under pressure but by forming concaved portions at the gas-diffusion cathode itself and setting the guide pieces in the concaved portions, the gas-diffusion cathode of the present invention can be produced with a high workability.

Also, it is preferred that the guide pieces are disposed in the gas-diffusion cathode such that a part of the guide pieces is exposed to the cathode chamber side of the gas-diffusion cathode, whereby the caustic alkali solution descending to the gravity direction is brought into contact with the guide piece and can be certainly guided to the cathode chamber side.

Furthermore, the salt water electrolytic cell of the present invention is a two-chamber-type or three-chamber-type salt water electrolytic cell, said electrolytic cell being partitioned by an ion-exchange membrane into an anode chamber or a cathode chamber or being partitioned by two ion-exchange membranes into an anode chamber, an intermediate chamber, and a cathode chamber, a metal or metal oxide-coated anode being disposed in the anode chamber, a gas-diffusion cathode being disposed in the cathode chamber, and a salt water containing a chloride ion and an oxygen-containing gas being supplied to the anode chamber and the cathode chamber respectively followed by carrying out an electrolysis to form a caustic alkali in the cathode chamber; wherein a gas-diffusion cathode having disposed therein at least one guide piece is used as the gas-diffusion cathode.

Because the electrolytic cell has incorporated therein the above-described gas-diffusion cathode, scaling-up of the electrolytic cell can be easily realized without lowering the electrode performance.

While the invention has been described in detail and with reference to specific embodiments thereof, it will be apparent to one skilled in the art that various changes and modifications can be made therein without departing from the spirit and scope thereof.

What is claimed is:

1. An electrolytic cell comprising a gas-diffusion cathode disposed in contact with an ion-exchange membrane, said membrane partitioning the electrolytic cell into an anode chamber and a cathode chamber, wherein at least one guide piece is disposed in the gas-diffusion cathode and is a rod or a sheet.

2. An electrolytic cell of claim 1, wherein at least one concaved portion is formed in the gas-diffusion cathode and at least one guide piece is set in the at least one concaved portion.

3. An electrolytic cell of claim 1, wherein the at least one guide piece is exposed to the cathode chamber side of the gas-diffusion cathode.

4. A two-chamber salt water electrolytic cell partitioned by an ion-exchange membrane into an anode chamber and a cathode chamber, wherein a metal- or metal oxide-coated anode is disposed in the anode chamber, and a gas-diffusion cathode is disposed in the cathode chamber, said cell being capable of performing electrolysis of salt water containing a chloride ion in the anode chamber and an oxygen-containing ion in the cathode chamber to form a caustic alkali in the cathode chamber; wherein said gas-diffusion cathode has disposed therein at least one guide piece which is a rod or a sheet.

5. A three-chamber salt water electrolytic cell partitioned by ion-exchange membranes into an anode chamber, an intermediate chamber, and a cathode chamber, wherein a metal- or metal oxide-coated anode is disposed in the anode chamber, and a gas-diffusion cathode is disposed in the cathode chamber, said cell being capable of performing electrolysis of salt water containing a chloride ion in the anode chamber and an oxygen-containing ion in the cathode chamber to form a caustic alkali in the cathode chamber; wherein said gas-diffusion cathode has disposed therein at least one guide piece which is a rod or a sheet.

* * * * *